Dec. 24, 1940.  A. LESAGE  2,226,247
FREEWHEEL LOCKING DEVICE, MORE PARTICULARLY FOR THE HUB OF BICYCLES
Filed Aug. 10, 1939
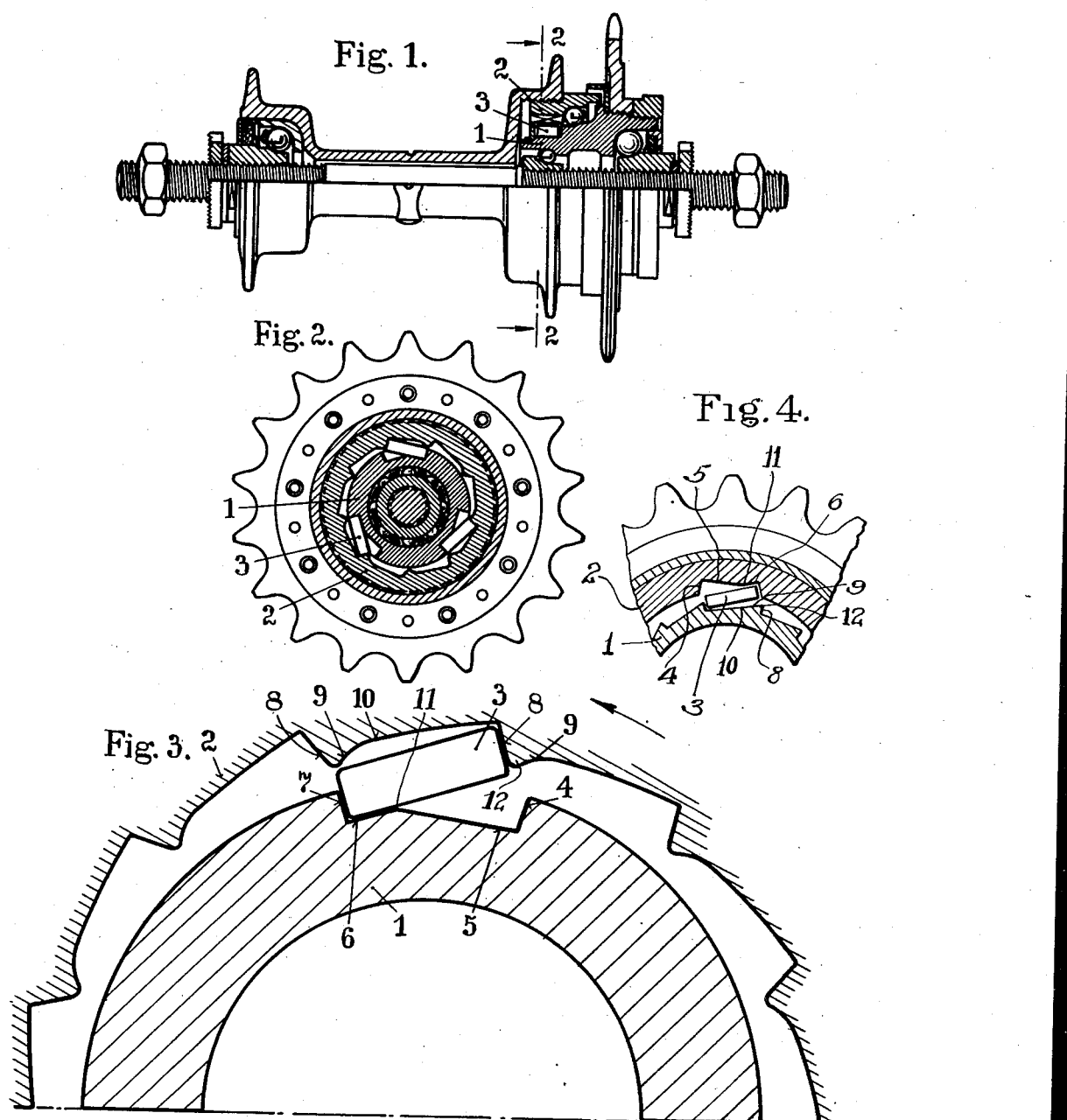
Inventor
Alfred Lesage
by Dean, Fairbank & Hirsch
Attorneys Patented Dec. 24, 1940

2,226,247

UNITED STATES PATENT OFFICE 2,226,247

FREEWHEEL LOCKING DEVICE, MORE PARTICULARLY FOR THE HUB OF BICYCLES

Alfred Lesage, Schweinfurt, Germany

Application August 10, 1939, Serial No. 289,380
In Germany September 28, 1938

2 Claims. (Cl. 192—64)

The present invention relates to a freewheel locking device particularly for the hub of bicycles and more specifically refers to a locking device provided with one or more block-like coupling members arranged between the driving part and the driven part of the free-wheel hub in recesses. In coupling position, each of these coupling members bears against an end surface of the recesses in both hub parts.

The bottom of each recess in the inner hub part is provided with a knife-like projection about which the respective coupling member tilts when the relative rotation of the two hub parts is reversed, this member being returned into coupling position by one of a series of teeth projecting from the outer hub part.

With locking devices of this kind it is well known to use coupling members in the form of a block having projections at the ends or at a tail member serving to effect equilibrium and in most cases at the middle portion, said projections being arranged at the bearing side in the shape of tooth-like points or noses. Such a construction requires specially formed additional and space consuming recesses in the parts of the hub, whereby the manufacturing costs are considerably raised. Besides this the projections are subjected to a rather strong wear so that the duration of the life and the safety of the locking device is affected.

In a similar known locking mechanism the coupling block conforms with the curvature of the hub parts and in the freewheel position is completely housed in the recess of the inner hub part. A spring stirrup with a bent portion extending into the recess of the coupling body is used to obtain a tilting movement into the coupling position as noiselessly as possible. This spring stirrup bears with tension against the outer hub part and due to friction effects coupling in the one direction of rotation but slides along the outer hub part in the other direction of rotation. In this case no control of the coupling member by teeth projecting from the outer hub part is effected. The spring stirrup very easily is worn off by the constant sliding along the outer hub part so that besides being subjected to the well known phenomenon of fatigue of springs the spring stirrup loses its tension and therefore the coupling is rendered inoperative due to lack of sufficient friction. Lubrication effecting a reduction of wear is impossible as in such a case the necessary friction could not be obtained.

In another known freewheel locking mechanism of the kind to which the present invention relates, the coupling member rolls upon a segmental curve formed in the bottom of the recess provided in the inner hub part. The length of this recess is greater than that of the block so that the latter may perform a shifting movement in the longitudinal direction in this recess. The curve shaped tooth flank of the recesses in the outer hub part is gradually inclined upwardly. The length of these recesses also considerably exceeds that of the coupling block. The latter in this case is provided at both ends with diverging tooth-like chamfered surfaces so that in the coupling position this block always may bear along a line of contact against the end bearing surfaces of the recesses in both the hub parts. Due to this construction the block performs a relatively small and slow swinging movement under the control of the teeth projecting from the outer hub part, and according to the position of the block in the recess provided in the inner hub part it may easily happen that the tooth-like point of the swinging out end of the coupling block impinges the points of the teeth formed on the outer hub part thereby resulting in damages which have an unfavorable effect upon the duration of life and the safety of the locking mechanism. Bearing of the coupling parts against each other along a line of contact, moreover, results in a disadvantageous strong wear. Moreover, movement or the shifting of the block in the longitudinal direction in the recess of the outer hub part effects noisy operations.

The object of the invention is to obviate the drawbacks of the known freewheel locking mechanisms of the kind mentioned above and to provide a strong and durable locking mechanism of simple construction, which occupies a small space, and which operates with as least noise as possible and with as great a factor of safety as possible.

To carry out the object of the present invention, the coupling member is in the form of an ashlar block, and the bottom of the recess corresponding in length to the length of the block is provided with a knife edge spaced from one end of the recess a distance equal approximately to one-third the length of said recess, to obtain a large, quick, safe, swinging movement of the block into coupling position. The coupling member is controlled by a tooth having a one-sided steep curve-like guiding flank arranged at the bottom of the recess of the outer part in a distance from the end bearing surface of the latter corresponding to the length of the coupling member.

By providing the coupling member in the form of an ashlar, i. e. a rectangular body having end surfaces extending parallel to each other these end surfaces in the coupling position solidly bear against the flat supporting or bearing surfaces of the recesses provided in both hub parts, thereby effecting transmission of large powers and practically excluding wear of the various relatively movable parts.

In the accompanying drawing two constructions of the locking device according to the invention are shown by way of example.

In this drawing:

Figure 1 is a view of a freewheel hub according to the invention and shown partly in section, Fig. 2 shows a cross section through the locking mechanism on line 2—2 of Fig. 1, Fig. 3 is a diagrammatic section of one half of the locking mechanism taken on a larger scale, and viewed in an axial direction opposite to that of Fig. 2, and Fig. 4 is a diagrammatic section through another form of mechanism embodying the present invention.

The locking mechanism substantially consists of two annular or disc-like or otherwise shaped hub parts 1 and 2 one of which is arranged coaxially in the bore of the other and one or more coupling members 3 in the form of an ashlar arranged in recesses between the two coupling parts and automatically effecting the connection by engagement into these recesses. In the hub part 1 is the driving part and part 2 is the driven part. The coupling member which, depending on the axial dimensions of the parts 1 and 2, may be of different width, normally lies in the recess 4 formed at the circumference of the inner part 1 the length of which substantially corresponds to that of the coupling member and the bottom of which is formed by two surfaces 5 and 6 arranged in obtuse angle. Near the one end of the recess 4 these surfaces intersect at a distance from the end bearing surface at 7 equal approximately to about a third of the length of the bottom to form a knife edge 11 about which the coupling member 3 may tilt. In the bore of the outer hub part 2 teeth 12 are formed by recesses the flanks of which are inclined at both sides. Against one of these flanks 8 which is flat the one end of the coupling member 3 bears if the other end of the latter rests upon the shorter surface 6 and bears against the neighbouring side—and end bearing surface 7 respectively of the recess 4. The bottom surface 10 of each of the recesses formed in the hub part 2 merges with a steep curve-like guide flank 9 into the tooth 12.

If the outer part 2 of the hub is rotated in the direction opposite to that indicated by the arrow, the coupling member 3 resting upon the surface 5 is pressed inwardly initially by the bottom surface 10 and then by the steep guiding flank 9 of the tooth which results in a tilting movement of the coupling member 3 around the knife edge 11 so that the tooth 12 may slide over the coupling member (freewheeling).

If the part 2 performs a relative rotation in the direction of the arrow (or vice versa the driving part 1 performs a rotation in the opposite direction of the arrow) the coupling member is brought into the coupling position shown in the drawing. This is effected in such a manner that a tooth 12 of the hub part 2 with its head side merging into the flat flank 8 slides over the coupling member initially resting upon the bottom part 5 of the recess of the inner hub part 1 until it passes the knife edge 11 arranged between the surfaces 5 and 6, at which moment a sudden short and powerful tilting of the coupling member 3 about the knife edge is effected. This causes the coupling member 3 to move into position shown in Fig. 3 with one end of said member solidly bearing against the end surface of the recess 4, while the other end of the coupling, after effecting a wide swing by the tilting movement above referred to, will solidly bear against the flat tooth flank 8 of the outer hub part 2.

Since the distance between the teeth 11 is equal to the length of the coupling block 3, upon relative movement of the part 2, the tooth 12 holding the coupling member 3 in position between the surfaces 6 and 7 slides over the coupling member 3 and releases the latter so that it again tilts about the knife edge and rests upon the bottom surface 5.

In a modification shown in Fig. 4, the recesses 4 provided with knife edge 11 could also be provided in the part 2 and the teeth 12 formed between surfaces or flanks 8 and 9 on the inner part 1.

What I claim is:

1. In a freewheel locking device particularly for the hub of bicycles, at least one block-like coupling member arranged in recesses between a driving part and a driven part of the freewheel hub and when in coupling position bearing against one end surface in each of the two opposite recesses in both hub parts and when in the reverse relative direction of rotation of the two parts in respect to each other, dropping into the recess of the inner part, the bottom of which recess is provided with a knife-like projection, said coupling member being adapted to perform a tilting movement about said knife-like projection during relative rotation of the two parts in opposite directions, said outer part having a projecting tooth for bringing said member into coupling position, said coupling member being shaped as an ashlar and the bottom of the recess formed in the inner part of the hub corresponding in length to that of said member, said knife-like projection being disposed at a distance of about a third of its length from the one end to obtain a large and quick swinging movement of said member and thereby effect safe introduction of the member into a coupling position, said coupling member being controlled by said tooth having a one-sided steep curve-like guiding flank arranged at the bottom of the recess of the outer part at a distance from the flat end bearing surface of the latter corresponding to the length of the member.

2. In a freewheel locking device particularly for the hub of bicycles, at least one block-like coupling member arranged in recesses between the driving part and the driven part of the freewheel hub, said hub parts being arranged in encircling relationship, said coupling member in coupling position bearing against one end surface in each of the two opposite recesses in both hub parts, and when said parts are rotated in reverse relative direction dropping into the recess of the inner part, one of the recesses on one of said parts being provided on its bottom with a knife-like projection, said coupling member being adapted to perform a tilting movement about said knife-like projection during relative rotation of the two parts in opposite directions, the other hub part having a projecting tooth for bringing said member into coupling position, said coupling member being shaped as an ashlar, and the bottom of the recess which is formed in the part of the hub having a knife-like projection corresponding in length to that of said member, said knife-like projection being disposed at a distance about one-third of its length from one end to obtain a large and quick swinging movement of said member, and thereby effect safe introduction of the member into coupling position, said coupling member being controlled by said tooth having a one-sided steep curve-like guiding flange arranged at the bottom of the recess of the hub part carrying the projecting tooth, and disposed at a distance from the flat end bearing surface of the latter corresponding to the length of the coupling member.

ALFRED LESAGE.